US007234032B2

(12) United States Patent
Durham et al.

(10) Patent No.: US 7,234,032 B2
(45) Date of Patent: Jun. 19, 2007

(54) COMPUTERIZED SYSTEM, METHOD AND PROGRAM PRODUCT FOR MANAGING AN ENTERPRISE STORAGE SYSTEM

(75) Inventors: Kimberly T. Durham, Chapel Hill, NC (US); Moon J. Kim, Wappingers Falls, NY (US); Dikran Meliksetian, Danbury, CT (US); Robert G. Oesterlin, Rochester, MN (US); Ronald W. Parker, Mahopac, NY (US); Blanche M. Waddell, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 10/718,419

(22) Filed: Nov. 20, 2003

(65) Prior Publication Data

US 2005/0114611 A1    May 26, 2005

(51) Int. Cl.
   *G06F 15/173*   (2006.01)
(52) U.S. Cl. ...................... 711/161; 709/226
(58) Field of Classification Search ............... 711/161; 709/226
   See application file for complete search history.

(56) References Cited

U.S. PATENT DOCUMENTS

| 5,659,786 | A | 8/1997 | George et al. |
| 5,784,702 | A | 7/1998 | Greenstein et al. |
| 6,247,109 | B1 | 6/2001 | Kleinsorge et al. |
| 6,587,938 | B1 | 7/2003 | Eilert et al. |
| 6,597,956 | B1 | 7/2003 | Aziz et al. |
| 2001/0029519 | A1 | 10/2001 | Hallinan et al. |
| 2002/0129085 | A1 | 9/2002 | Kubala et al. |
| 2003/0046270 | A1* | 3/2003 | Leung et al. ................ 707/1 |
| 2003/0120701 | A1 | 6/2003 | Pulsipher et al. |
| 2003/0126265 | A1 | 7/2003 | Aziz et al. |
| 2004/0230795 | A1* | 11/2004 | Armitano et al. ........... 713/165 |

OTHER PUBLICATIONS

Sheresh et al, Microsoft Windows NT Server Administrator's Bible: Option Pack Edition, Apr. 1999, chapter 1, p. 2.*

* cited by examiner

*Primary Examiner*—Brian R. Peugh
*Assistant Examiner*—Jared Rutz
(74) *Attorney, Agent, or Firm*—William E. Schiesser; Hoffman, Warnick & D'Alessandro LLC

(57) ABSTRACT

Under the present invention storage grid manager is provided that receives requests for storing files from users, based on certain performance parameters, the storage grid manager identifies selected storage cells of the enterprise storage system for storing the files. Thereafter, the storage grid manager routes the requests to the storage grid controllers associated with the selected storage cells. The storage grid controllers control access to the storage cells to ensure that only authorized access is granted. Once the files are stored, the storage grid manager will update a mapping to identify the precise storage cells in which each file is stored. Therefore, when a user issues a request to retrieve a file, the storage grid manager consults the mapping, identifies the corresponding storage cell and retrieves the file.

28 Claims, 6 Drawing Sheets

COMPUTERIZED SYSTEM, METHOD AND PROGRAM PRODUCT FOR MANAGING AN ENTERPRISE STORAGE SYSTEM

FIELD OF THE INVENTION

The present invention generally relates to a computerized system, method and program product for managing an enterprise storage system. Specifically, the present invention optimizes the use the storage cells of an enterprise storage system.

BACKGROUND OF THE INVENTION

As the use of information technology (IT) becomes more prevalent, it has become increasingly common for many organizations to use enterprise storage systems for storing files and the like. In an enterprise storage system, multiple data storage cells or farms are provided at different geographic locations throughout the country or world. These cells can be used for sharing files among individuals within the organizations. For example, International Business Machines Corp. of Armonk, N.Y. uses a technology known as the Global Storage Architecture (GSA) for file sharing.

Unfortunately, in many enterprise storage systems such as the GSA, vast quantities of the available resources are unbalanced and/or unused due to the clustering design. Specifically, it is currently the case that files are stored based on geographic parameters. For example, if user "A" is located on the east coast of the United States, currently technologies would store his/her files in the nearest cell. However, such storage might not make the best use of the overall system. Rather, it could be the case that the east coast cell is nearing its capacity, while a midwest cell is virtually empty. Further, it could be the case that the east coast cell does not support a needed rate of network connectivity, while another cell does. Accordingly, none of the existing technologies take performance-based parameters such as storage capacity, user requirements, etc., into consideration when selecting a file sharing location.

In view of the foregoing, there exists the need for a computerized system, method and program product for managing enterprise storage farms. Specifically, a need exists for a system that better utilizes storage resources. To this extent, a need exists for a system that stores files based on certain performance parameters.

SUMMARY OF THE INVENTION

In general, the present invention provides a computerized system, method and program product for managing an enterprise storage system. Specifically, under the present invention a storage grid manager receives requests for storing files from users. Based on certain predetermined performance parameters, the storage grid manager identifies appropriate/selected storage cells of the enterprise storage system for storing the files. Thereafter, the storage grid manager routes the requests to storage grid controllers associated with the selected storage cells. The storage grid controllers control access to the storage cells to ensure that only authorized access is granted. Once the files are stored, the storage grid manager will update a mapping to identify the precise storage cells in which each file is stored. Therefore, when a user issues a request to retrieve a file, the storage grid manager consults the mapping, identifies the corresponding storage cell, and retrieves the file.

A first aspect of the present invention provides a computerized system for managing an enterprise storage system, comprising a storage grid manager for receiving requests for storing files from users, and for routing the requests to storage grid controllers associated with selected storage cells of the enterprise storage system where the files will be stored, wherein the selected storage cells are identified based on at least one predetermined performance parameter.

A second aspect of the present invention provides a computerized system for managing an enterprise storage system, comprising: a storage grid manager for receiving requests for storing files from users; and a set of storage grid controllers associated with a set of storage cells of the enterprise storage system, wherein the storage grid manager identifies selected storage cells for storing the files based on at least one predetermined performance parameter and routes the requests to the storage grid controllers associated with the selected storage cells.

A third aspect of the present invention provides a computer-implemented method for storing files in an enterprise storage system, comprising: receiving requests on a storage grid manager to store the files; identifying storage cells of the enterprise storage system for storing the files based on at least one performance parameter; routing the requests from the storage grid manager to storage grid controllers associated with the storage cells; and storing the files in the storage cells.

A fourth aspect of the present invention provides a computer-implemented method for retrieving files from an enterprise storage system, comprising: receiving requests on a storage grid manager to retrieve the files; identifying storage cells of the enterprise storage system in which the files are stored based a mapping; routing the requests from the storage grid manager to storage grid controllers associated with the storage cells; and retrieving the files from the storage cells.

A fifth aspect of the present invention provides a program product stored on a recordable medium for managing an enterprise storage system, which when executed, comprises a storage grid manager for receiving requests for storing files from users, and for routing the requests to storage grid controllers associated with selected storage cells of the enterprise storage system where the files will be stored, wherein the selected storage cells are identified based on at least one predetermined performance parameter.

Therefore, the present invention provides a computerized system, method and program product for managing an enterprise storage system.

BRIEF DESCRIPTION OF THE DRAWINGS

These and other features of this invention will be more readily understood from the following detailed description of the various aspects of the invention taken in conjunction with the accompanying drawings in which.

Figure 1:
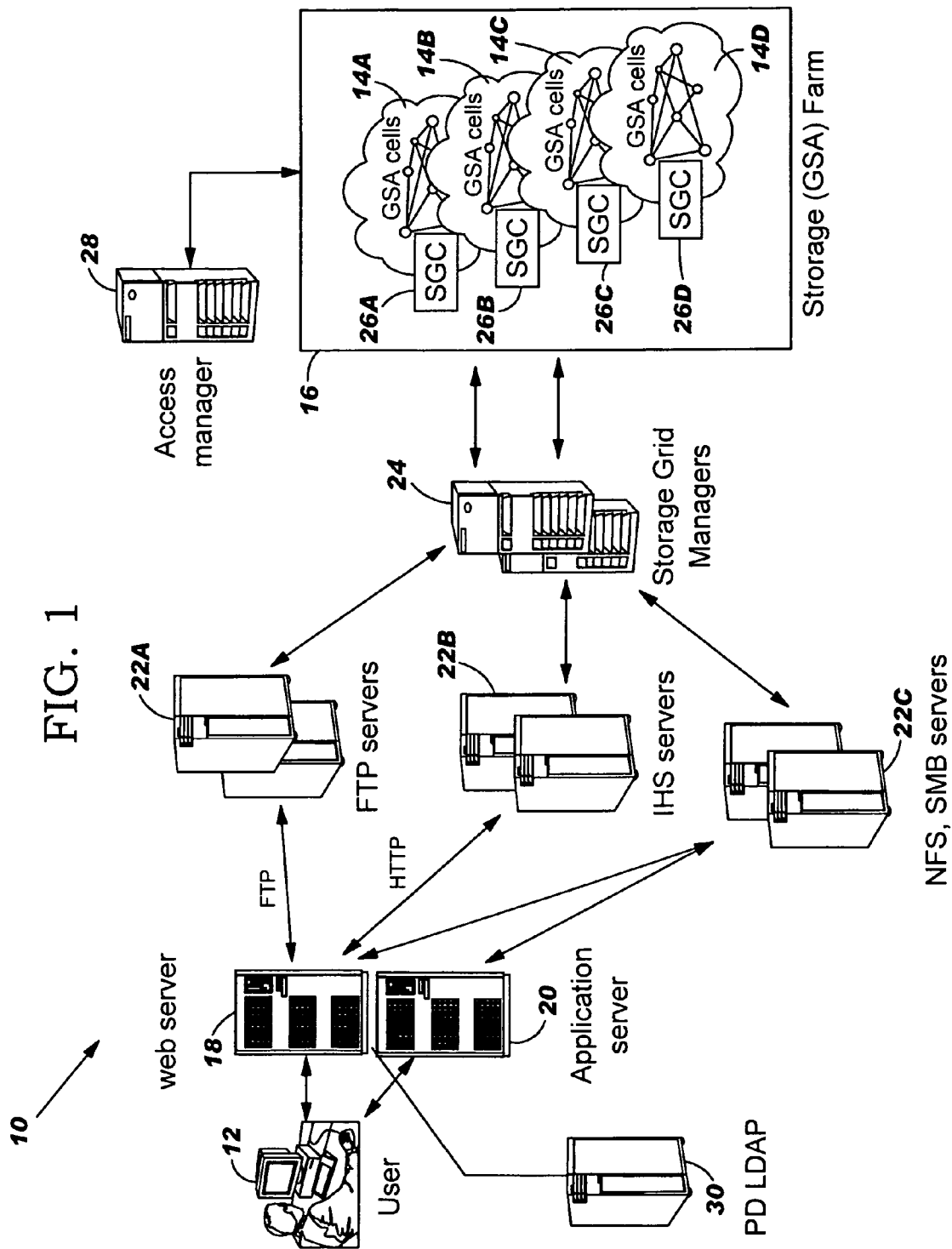
FIG. 1 depicts a storage grid architecture according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a computerized system, method and program product for managing an enterprise storage system. Specifically, under the present invention a storage grid manager receives requests for storing files from users. Based on certain predetermined performance parameters, the storage grid manager identifies appropriate/selected storage cells of the enterprise storage system for storing the files. Thereafter, the storage grid manager routes the requests to storage grid controllers associated with the selected storage cells. The storage grid controllers control access to the storage cells to ensure that only authorized access is granted. Once the files are stored, the storage grid manager will update a mapping to identify the precise storage cells in which each file is stored. Therefore, when a user issues a request to retrieve a file, the storage grid manager consults the mapping, identifies the corresponding storage cell, and retrieves the file.

It should be understood in advance that although the invention is typically used to manage the storage and retrieval "files," it can be used to manage the storage and retrieval of any type of information.

In any event, referring now to FIG. 1 a storage grid architectural (SGA) diagram 10 according to the present invention is depicted. In general, SGA 10 allows users such as user 12 to store files and the like in one or more storage cells/farms 14A–D of enterprise storage system 16. To this extent, SGA is typically implemented over a network such as the Internet, a local area network (LAN), a wide area network (WAN), a virtual private network (VPN), etc. As such, communication between the various components shown in FIG. 1 could occur in a client-server or server-server environment via a direct hardwired connection (e.g., serial port), or via an addressable connection that may utilize any combination of wireline and/or wireless transmission methods. The components may utilize conventional network connectivity, such as Token Ring, Ethernet, WiFi or other conventional communications standards. Moreover, connectivity could be provided by conventional TCP/IP sockets-based protocol. In this instance, the components could utilize an Internet service provider to establish connectivity. It should be appreciated that the architecture shown in FIG. 1 is intended to be illustrative only and that other variations could be implemented within the scope of the present invention. For example, any quantity of storage cells 14A–D and/or storage grid managers 24 could be provided.

Regardless, in a typical embodiment, user 12 will store a file by generating a request via an application on his/her computer system (e.g., a personal computer, a workstation, a laptop, a hand-held device, etc.). Depending on the desired communication protocol, the request will be transmitted to web server 18 and/or application server 20, and from there to a respective "protocol" server 22A–C. For example, if user 12 desired to use File Transfer Protocol (FTP) to request storage of the file, the request would be routed to web server 18 and then to FTP server 22A. As such, the present invention can accommodate any type of protocol user 12 might wish to utilize. For example, storage can be provided for Hypertext Transfer Protocol (HTTP), Common Internet File System (CIFS), Network File System (NFS), Server Message Block Protocol (SMB), etc.

Once the request is received by a protocol server 22A–C, it will be routed to storage grid manager 24 (e.g., to one a possible group of storage-grid managers). As will be further described below, storage grid manager 24 is configured to determine the most optimal or appropriate storage cell 14A–D for storing the file. In general, this determination is made under the present invention based on certain predetermined performance parameters. For example, the determination can be made based upon a user identity, a storage cost, a specific user requirement, desired a cell usage pattern/balance, a security requirement, a storage cell availability, a redundancy requirement and a network optimization requirement. Thus, if a file required access by a group of users, it could be stored in a storage cell 14A–D that is most central to all such users, not just the user requesting the storage. Moreover, if a certain storage cell 14A–D was nearing capacity, the file might be stored in another (albeit more distant) storage cell 14A–D so that the load of storage cells 14A–D could be kept balanced.

Figure 2:
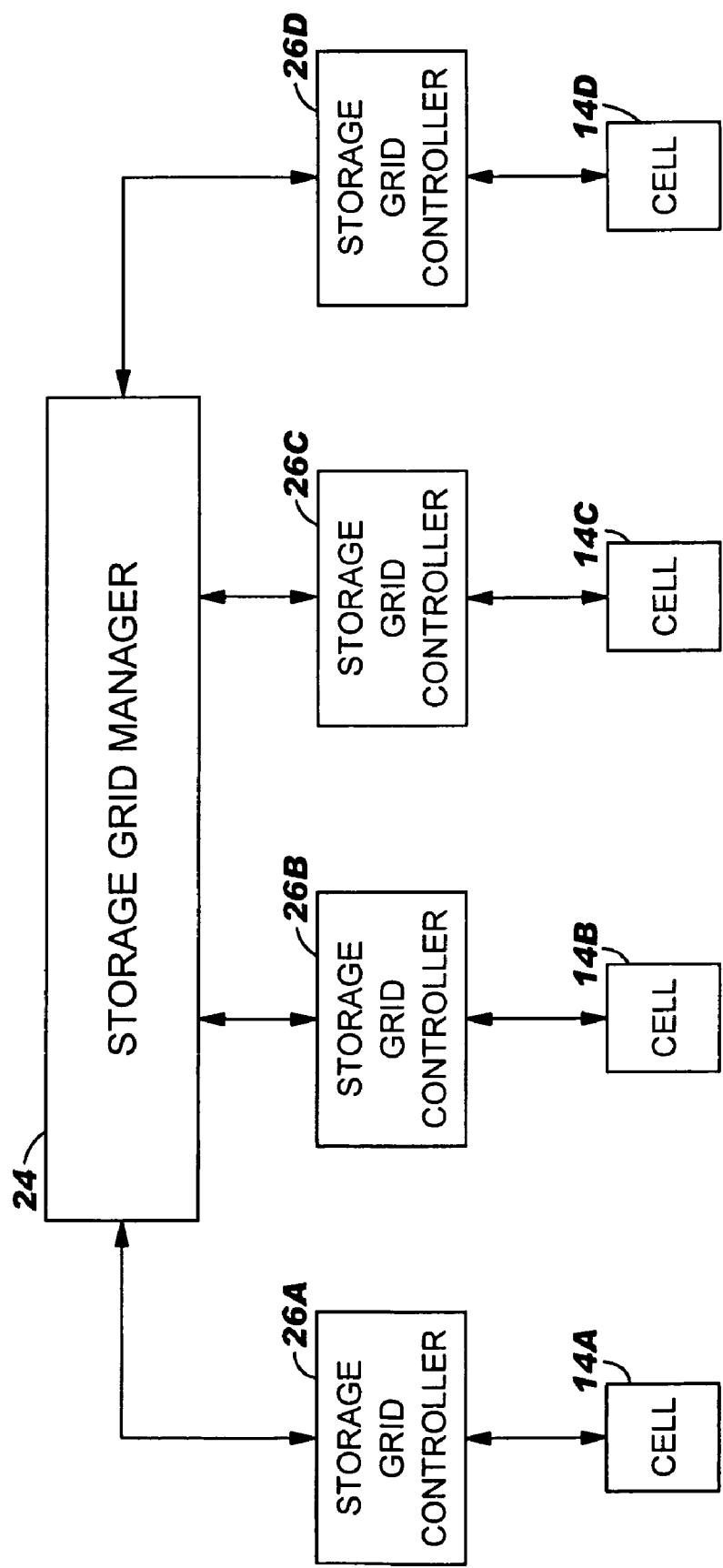
FIG. 2 depicts the relationship between the storage grid manager, the storage grid controllers and the storage cells of FIG. 1 in greater detail.

In any event, once the appropriate storage cell 14A–D is identified, storage grid manager 24 will route the request to the storage grid controller 26A–D corresponding thereto. Specifically, each storage cell 14A–D is associated with one storage grid controller 26A–D. This relationship is further depicted in FIG. 2. As can be seen each storage grid controller 26A–D is associated with a single storage cell 14A–D. This relationship allows each storage grid controller 14A–D to serve at least two primary functions. Namely, to provide resource information about storage cells 14A–D to storage grid manager 24, and to act as a "gatekeeper" of its respective storage cell 14A–D. In the case of the former, under the present invention, storage grid manager 24 will receive information regarding capacity of the storage cells 14A–D. This information can be communicated upon request by storage grid manager 24, or updates can be periodically sent from each storage cell 14A–D via storage grid controllers 26A–D. In either event, the resource information is used by storage grid manager 24 in determining which storage cell 14 is the most appropriate for storing the file. For example, as indicated above, if storage cell 14A is closest geographically to user 12, but is close to capacity, storage grid manager 24 might route the request to storage cell 14B.

Assuming storage cell 14B was identified as the most appropriate storage location for the file, storage grid manager 24 will route the request to store the file to storage grid cell 14B via storage grid controller 26B. In so doing, storage grid manager 24 will likely add additional information such as an identification and/or authorization/authentication information for user 12. Moreover, the request will typically be routed from storage grid manager 24 using the same protocol in which it was received by storage grid manager 24, or via a private protocol.

Figure 3:
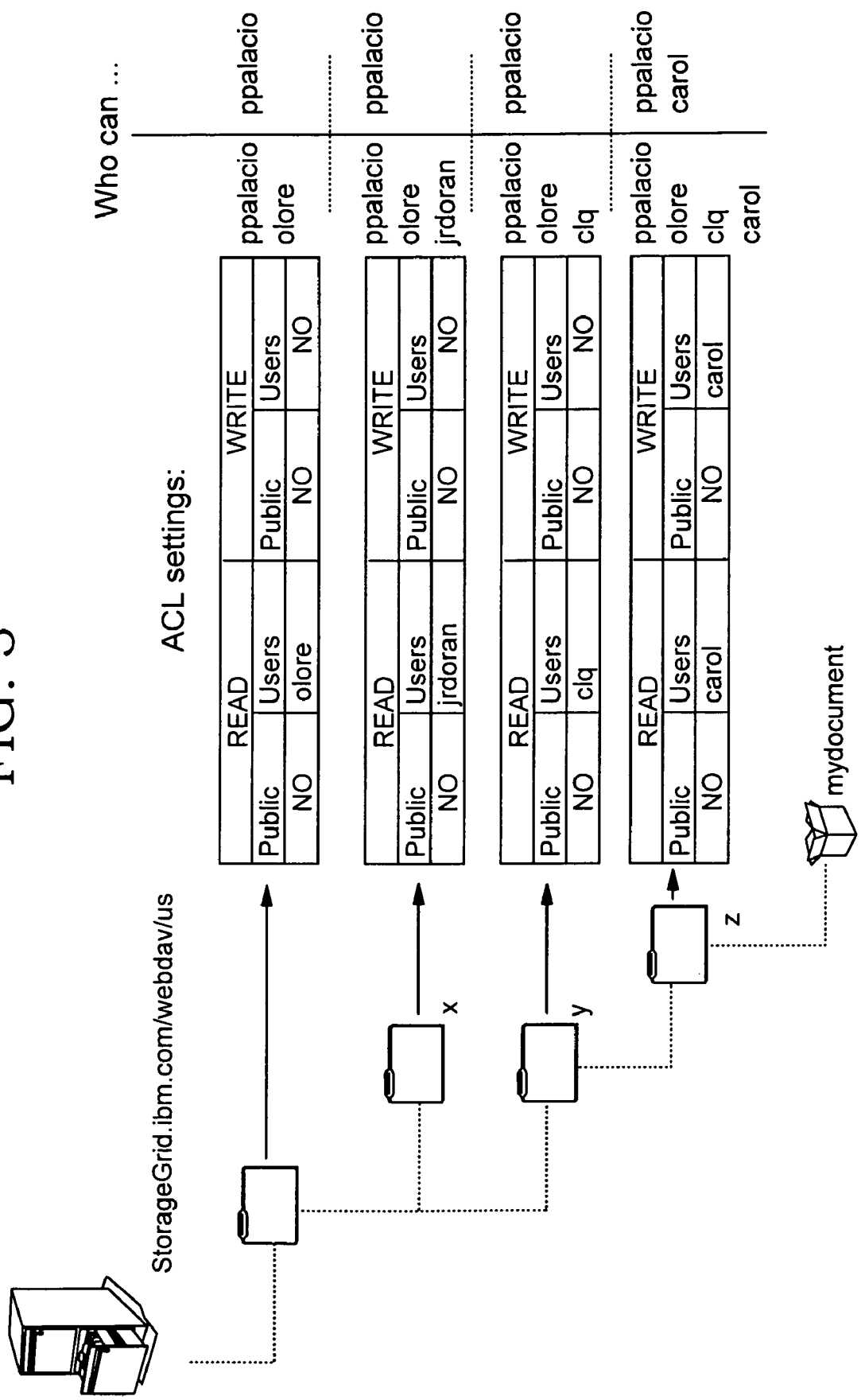
FIG. 3 depicts an access control specification according to the present invention.

Upon receipt of the request, the storage grid controller 26B will consult access manager 28, which will access PD Lightweight Directory Access Protocol (LDAP) directory 30 to determine if user 30 is authorized to access storage cell 14B (i.e., enforce access control specifications for storage cells 14A–D). In a typical embodiment, LDAP directory 30 is a DB2 database that stores permissions in an additive hierarchy such as shown in FIG. 3. Specifically, after a user is given permission to a path, the user has that same permission to all sub-paths under it. The user cannot be added with the same permission to any of the sub-paths. Ones and zeros represent permissions in the database. A one indicates that the user has a particular permission to a resource and a zero is a place holder. A zero does not indicate a negative permission. Rather, it merely says that a particular permission was not granted at that level of the hierarchy to a particular user. Moreover, there can be a situation where a user has a record granting access at a certain level and a level below that. This situation can occur when access to the higher level was granted after access to the lower level had been granted.

Assuming that user 12 was authorized to access storage cell 14B, the file will be stored therein and storage grid manager 24 will update a mapping that correlates files with the storage cells in which they are stored Specifically, among its other functions, storage grid manager 24 maintains a mapping that it updates as files are stored in storage cells 14A–D. Thus, if user 12 later issues a request to retrieve the file, the request will be routed to storage grid manager 24, which will consult the mapping to identify the appropriate storage cell 14B. Upon so doing, storage grid manager 24 will route the request to storage cell 14B and/or storage grid controller 26B, which will again perform access control via access manager 28 and LDAP 30. Assuming user 12 is still authorized to access storage cell 14B, the file will be retrieved for access by user 12.

Figure 4:
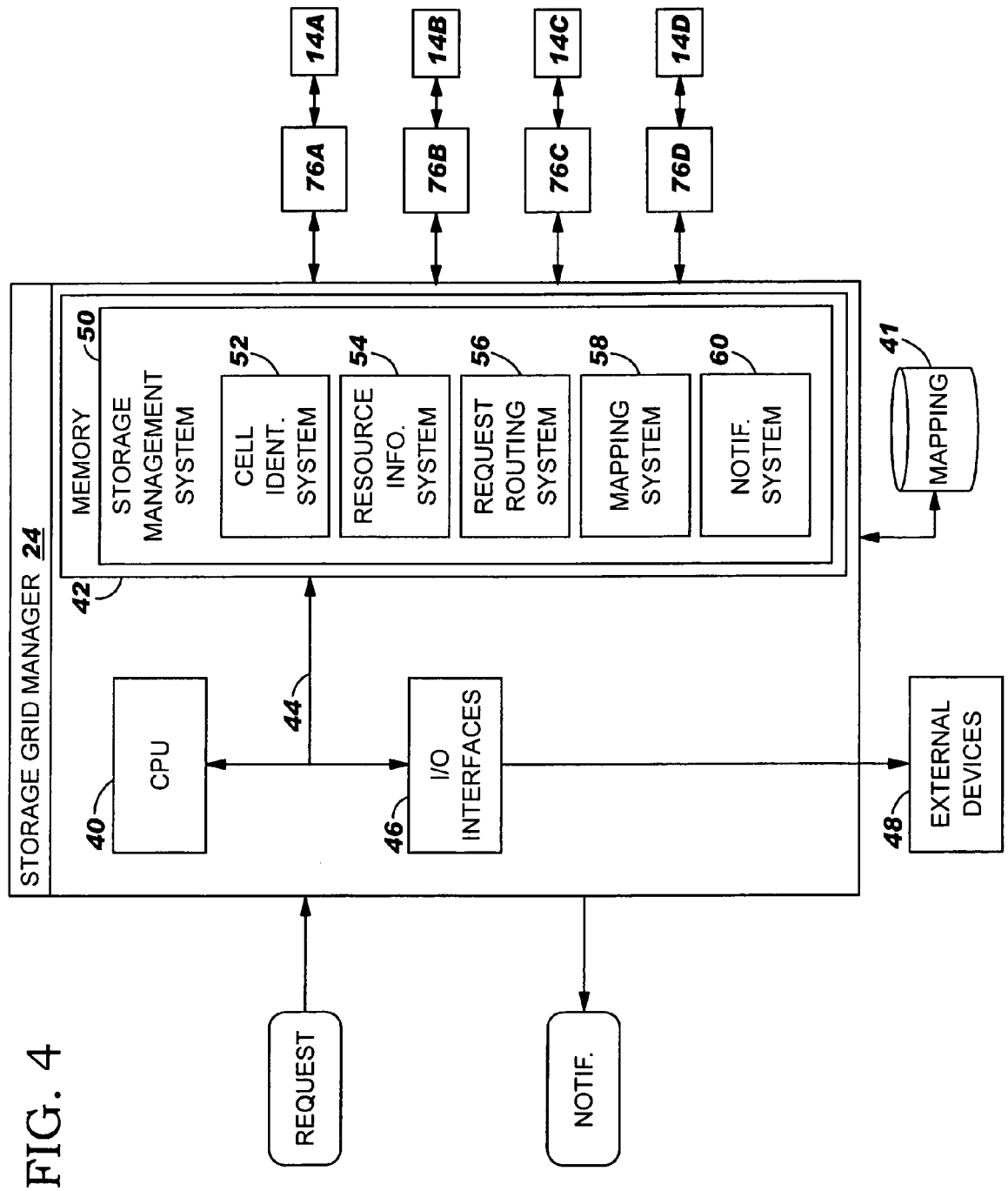
FIG. 4 depicts a more detailed diagram of a storage grid manager of FIG. 1.

Referring now to FIG. 4, a more detailed diagram of storage grid manager 24 is shown. As depicted, storage grid manager 24 generally includes central processing unit (CPU) 40, memory 42, bus 44, input/output (I/O) interfaces 46, external devices/resources 48 and storage unit 49. CPU 40 may comprise a single processing unit, or be distributed across one or more processing units in one or more locations, e.g., on a client and computer system. Memory 42 may comprise any known type of data storage and/or transmission media, including magnetic media, optical media, random access memory (RAM), read-only memory (ROM), a data cache, etc. Moreover, similar to CPU 40, memory 42 may reside at a single physical location, comprising one or more types of data storage, or be distributed across a plurality of physical systems in various forms.

I/O interfaces 46 may comprise any system for exchanging information to/from an external source. External devices/resources 48 may comprise any known type of external device, including speakers, a CRT, LCD screen, handheld device, keyboard, mouse, voice recognition system, speech output system, printer, monitor/display, facsimile, pager, etc. Bus 44 provides a communication link between each of the components in storage grid manager 24 and likewise may comprise any known type of transmission link, including electrical, optical, wireless, etc.

Storage unit 49 can be any system (e.g., database) capable of providing storage for information under the present invention. Such information could include, for example, the mapping maintained by storage grid manager 24. As such, storage unit 49 could include one or more storage devices, such as a magnetic disk drive or an optical disk drive. In another embodiment, storage unit 49 includes data distributed across, for example, a local area network (LAN), wide area network (WAN) or a storage area network (SAN) (not shown). Furthermore, although not shown, additional components, such as cache memory, communication systems, system software, etc., may be incorporated into storage grid manager 24. In addition, it should be appreciated that although not shown, the computer system operated by user, the web server, the application server, the protocol servers, the access manager and the storage grid controllers 26A–D can include computerized components similar to storage grid manager 24. Such components have not been shown for brevity purposes.

In any event, shown in memory 42 of storage grid manager 24 as a program product is storage management system 50, which generally includes cell identification system 52, resource information system 54, request routing system 56, mapping system 58 and notification system 60. Under the present invention, requests to store files will be received by storage grid manager 24. At that point, cell identification system 52 will use the performance parameters to identify appropriate storage cells 14A–D for storing the files. As indicated above, such parameters could include, among others, a user identity, a storage cost, a user requirement, a desired cell usage pattern/balance, a security requirement, a storage cell availability, a redundancy requirement and a network optimization requirement. In making this determination, storage grid manager 24 will use resource information about storage cells 14A–D such as available space that is received via resource information system 54. This information can be obtained based on queries made by resource information system 54, or via updates periodically sent via storage grid controllers 26A–D.

In any event, once the appropriate storage cells 14A–D are identified, request routing system 56 will route the requests to the appropriate storage cells 14A–D (i.e., via the storage grid controllers 26A–D associated therewith). Upon receipt, access enforcement systems (not shown) within the storage grid controllers 26A–D will determine whether the users are authorized to access the respective storage cells 14A–D. If so, the files are stored accordingly. Upon such storage, mapping system 58 will update the mapping to reflect the locations in which the files were stored, and notification system 60 will notify the users accordingly.

Requests to retrieve the files will similarly be received by storage grid manager 24. Upon receipt, cell identification system 52 will consult the mapping to identify the pertinent storage cells 14A–D, and request routing system 56 will route the retrieval requests to the identified storage cells 14A–D. Similar to storage of the files, access control systems within the storage grid controllers 26A–D will ensure that the users are authorized to have such access. If so, the files are retrieved and notification system 60 will notify the users accordingly.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 5:
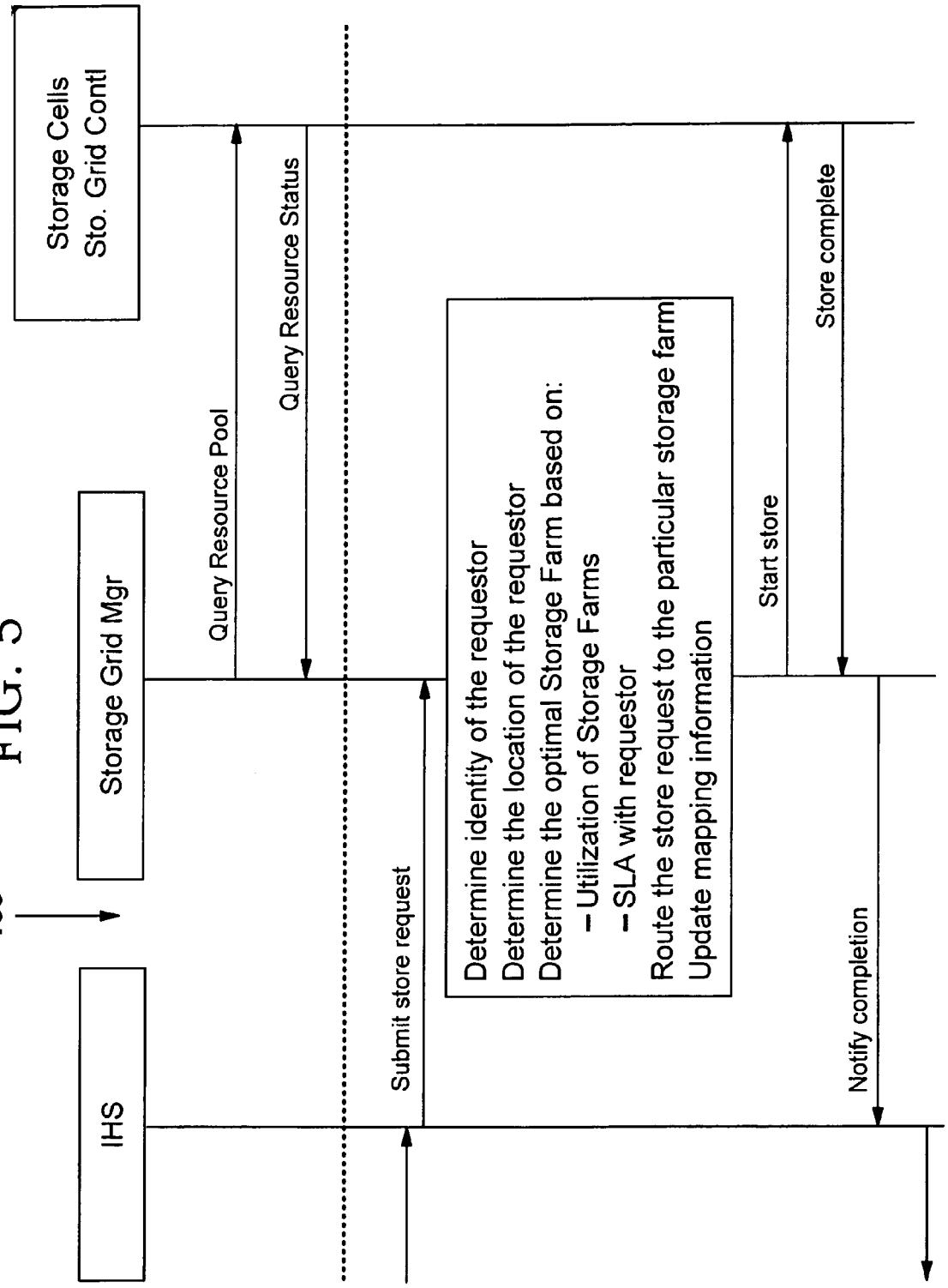
FIG. 5 depicts a state diagram for storing files according to the present invention.

Referring now to FIG. 5, a state diagram 100 of file storage is shown. As depicted, when a user wishes to store a file, the user will first submit a store request to the storage grid manager. Using resource information obtained from the storage cells (via the storage grid controllers), the storage grid manager will identify the most appropriate storage cell in which to store the file. Under the present invention, this determination is based on factors in addition or other than geography. For example, a user identity, a storage cost, a user requirement, a desired cell usage pattern/balance, a security requirement, a storage cell availability, a redundancy requirement, a network optimization requirement, etc. Once identified, the storage grid manager will forward the request to the associated storage grid controller, which after verifying authorization of the user, will permit storage of the file. Upon completion, the storage grid manager will update the mapping and notify the user.

Figure 6:
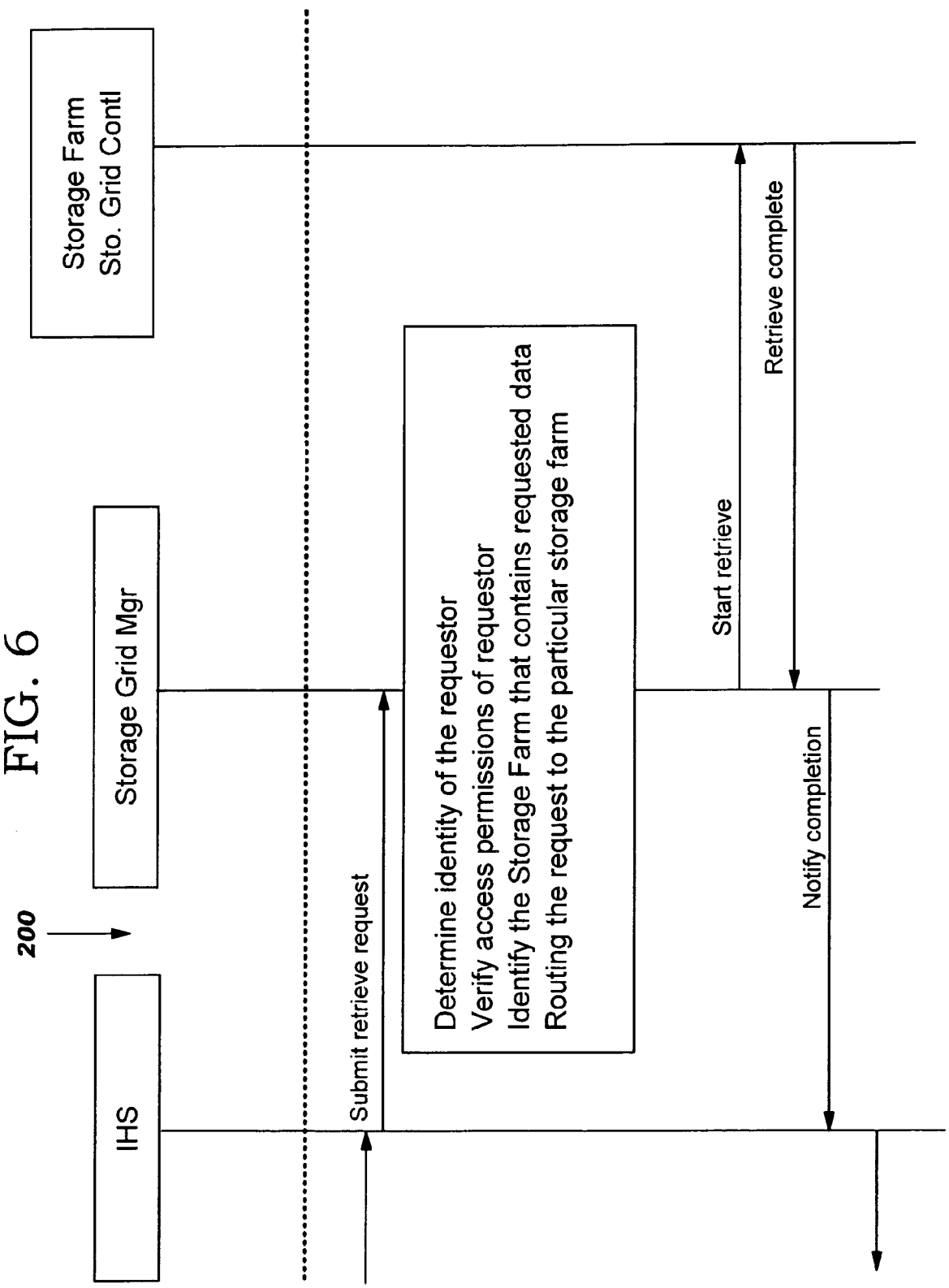
FIG. 6 depicts a state diagram for retrieving files according to the present invention.

Referring to FIG. 6 a state diagram 200 of file retrieval is shown. As depicted, when a user wishes to retrieve the file, the user will first submit a retrieval request to the storage grid manager. Using the mapping, the storage grid manager will identify the appropriate storage cell where the requested file is stored, and communicate the request thereto (via the associated storage grid controller). After confirming authorization of the user to access the file/storage cell, the file will be retrieved for the user and a corresponding notification will be sent.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A computerized system for managing a geographically separated enterprise storage system, comprising a storage grid manager for receiving requests for storing files from users that are remote from storage cells of the enterprise storage system, and for routing the requests to storage grid controllers associated with selected storage cells of the enterprise storage system where the files will be stored, wherein the selected storage cells are identified based on at least one predetermined performance parameter in case that a storage cell that is identified based on a geographical parameter is not optimal, wherein the requests are routed to the selected storage cells in identical communication protocols in which the requests are received by the storage grid manager.

2. The system of claim 1, wherein the storage grid controllers are each associated with a single storage cell, and wherein the storage grid controllers provide resource availability information about the storage cells to the storage grid manager.

3. The system of claim 2, wherein the storage grid controllers further enforce access control specifications for the storage cells.

4. The system of claim 1, wherein the storage grid manager further maintains a mapping that associates the files with the selected storage cells in which the files are stored.

5. The system of claim 4, wherein the storage grid manager further receives requests to retrieve the files from the users, and wherein the storage grid manager consults the mapping to identify the selected storage cells and retrieve the files.

6. The system of claim 1, wherein the predetermined performance parameter is selected from the group consisting of a user identity, a storage cost, a user requirement, a usage pattern, a security requirement, a storage cell availability, a redundancy requirement and a network optimization requirement.

7. A computerized system for managing a geographically separated enterprise storage system, comprising:
a storage grid manager for receiving requests for storing files from users that are remote from storage cells of the enterprise storage system; and
a set of storage grid controllers associated with a set of storage cells of the enterprise storage system, wherein the storage grid manager identifies selected storage cells for storing the files based on at least one predetermined performance parameter and routes the requests to the storage grid controllers associated with the selected storage cells in case that a storage cell that is identified based on a geographical parameter is not optimal, wherein the requests are routed to the selected storage cells in identical communication protocols in which the requests are received by the storage grid manager.

8. The system of claim 7, wherein each of the set of the storage grid controllers are each associated with a single storage cell, and wherein the set of storage grid controllers provide resource availability information about the set of storage cells to the storage grid manager.

9. The system of claim 8, wherein the set of storage grid controllers further enforce access control specifications for the storage cells.

10. The system of claim 8, wherein the storage grid manager further maintains a mapping that associates the files with the selected storage cells in which the files are stored.

11. The system of claim 10, wherein the storage grid manager further receives requests to retrieve the files from the users, and wherein the storage grid manager consults the mapping to identify the selected storage cells and retrieve the files.

12. The system of claim 8, wherein the predetermined performance parameter is selected from the group consisting of a user identity, a storage cost, a user requirement, a desired cell usage pattern, a security requirement, a storage cell availability, a redundancy requirement and a network optimization requirement.

13. A computer-implemented method for storing files in a geographically separated enterprise storage system, comprising:
receiving requests that are remote from storage cells of the enterprise storage system on a storage grid manager to store the files;
identifying storage cells of the enterprise storage system for storing the files based on at least one performance parameter in case that a storage cell that is identified based on a geographical parameter is not optimal;
routing the requests from the storage grid manager to storage grid controllers associated with the storage cells; and
storing the files in the storage cells,
wherein the routing step comprises routing the requests to the storage cells in identical communication protocols in which the requests are received by the storage grid manager.

14. The method of claim 13, wherein the at least one performance parameter is selected from the group consisting of a user identity, a storage cost, a user requirement, a desired cell usage pattern, a security requirement, a storage cell availability, a redundancy requirement and a network optimization requirement.

15. The method of claim 13, further comprising the storage grid controllers providing resource availability information about the set of storage cells to the storage grid manager, prior to the identifying step.

16. The method of claim 13, further comprising the storage grid controllers enforcing access control specifications for the storage cells, prior to the storing step.

17. The method of claim 13, further comprising the storage grid manager maintaining a mapping that associates the files with the storage cells in which the files are stored, after the storing step.

18. The method of claim 17, further comprising retrieving the files from the appropriate storage cells with the following steps:

receiving requests on the storage grid manager to retrieve the files;

consulting the mapping to identify the storage cells; and retrieving the files from the storage cells.

19. A computer-implemented method for retrieving files from a geographically separated enterprise storage system, comprising:

receiving requests that are remote from storage cells of the enterprise storage system on a storage grid manager to retrieve the files;

identifying storage cells of the enterprise storage system in which the files are stored based a mapping in case that a storage cell that is identified based on a geographical parameter is not optimal;

routing the requests from the storage grid manager to storage grid controllers associated with the storage cells; and retrieving the files from the storage cells, wherein the routing step comprises routing the requests to the storage cells in identical communication protocols in which the requests are received by the storage grid manager.

20. The method of claim 19, further comprising storing the files, prior to the receiving step, with the following steps:

receiving requests on the storage grid manager to store the files;

identifying storage cells of the enterprise storage system for storing the files based on at least one performance parameter;

routing the requests to store the files from the storage grid manager to storage grid controllers associated with the storage cells; and storing the files in the storage cells.

21. The method of claim 20, wherein the at least one performance parameter is selected from the group consisting of a user identity, a storage cost, a user requirement, a desired cell usage pattern, a security requirement, a storage cell availability, a redundancy requirement and a network optimization requirement.

22. The method of claim 19, further comprising the storage grid controllers enforcing access control specifications for the storage cells, prior to the retrieving step.

23. A program product stored on a computer readable medium for managing a geographically separated enterprise storage system, which when executed, comprises a storage grid manager for receiving requests for storing files from users that are remote from storage cells of the enterprise storage system, and for routing the requests to storage grid controllers associated with selected storage cells of the enterprise storage system where the files will be stored, wherein the selected storage cells are identified based on at least one predetermined performance parameter in case that a storage cell that is identified based on a geographical parameter is not optimal, wherein the requests are routed to the selected storage cells in identical communication protocols in which the requests are received by the storage grid manager.

24. The program product of claim 23, wherein the storage grid controllers are each associated with a single storage cell, and wherein the storage grid controllers provide resource availability information about the storage cells to the storage grid manager.

25. The program product of claim 24, wherein the storage grid controllers further enforce access control specifications for the storage cells.

26. The program product of claim 23, wherein the storage grid manager further maintains a mapping that associates the files with the selected storage cells in which the files are stored.

27. The program product of claim 26, wherein the storage grid manager further receives requests to retrieve the files from the users, and wherein the storage grid manager consults the mapping to identify the selected storage cells and retrieve the files.

28. The program product of claim 23, wherein the predetermined performance parameter is selected from the group consisting of a user identity, a storage cost, a user requirement, a desired cell usage pattern, a security requirement, a storage cell availability, a redundancy requirement and a network optimization requirement.

* * * * *